(12) United States Patent
Dyck et al.

(10) Patent No.: US 7,590,408 B2
(45) Date of Patent: Sep. 15, 2009

(54) SYSTEMS AND METHODS FOR EARLY DETERMINATION OF NETWORK SUPPORT FOR MOBILE IP

(75) Inventors: Jeffrey Alan Dyck, San Diego, CA (US); Marcello Lioy, San Diego, CA (US); Nischal Abrol, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 184 days.

(21) Appl. No.: 10/318,778

(22) Filed: Dec. 12, 2002

(65) Prior Publication Data

US 2003/0224757 A1 Dec. 4, 2003

Related U.S. Application Data

(60) Provisional application No. 60/370,029, filed on Apr. 3, 2002, provisional application No. 60/370,033, filed on Apr. 3, 2002.

(51) Int. Cl.
*H04M 1/00* (2006.01)
*H04M 1/66* (2006.01)
*H04Q 7/20* (2006.01)
*H04B 17/00* (2006.01)
*H04L 12/56* (2006.01)

(52) U.S. Cl. .............. 455/411; 455/67.11; 455/67.14; 455/423; 455/550.1; 455/556.2; 370/395.52

(58) Field of Classification Search .............. 455/450, 455/410–411, 435.1–435.3, 445, 67.11, 67.13, 455/67.14, 403, 418–420, 423–425, 432.3, 455/509, 550.1, 552.1, 553.1, 556.1–556.2, 455/558, 516–517, 524–525, 560–561; 370/328–329, 370/229–230, 310, 338, 341, 395.5, 395.52, 370/216–226, 241–255; 379/1.01, 9.01, 379/10.01, 14, 21, 26.01, 900, 1.03, 214.01, 379/22.03, 27.01; 709/202–203, 221–222, 709/228–229, 237; 348/14.01–14.02
See application file for complete search history.

(56) References Cited

U.S. PATENT DOCUMENTS

4,875,873 A 10/1989 Ishizuka et al.

(Continued)

FOREIGN PATENT DOCUMENTS

JP 08-180930 7/1996

(Continued)

OTHER PUBLICATIONS

W. Simpson, "The Point-to-Point Protocol (PPP)," Network Working Group, Jul. 1994, pp. 1-47.

(Continued)

*Primary Examiner*—Meless N Zewdu
(74) *Attorney, Agent, or Firm*—Abdullah Katbab; Kristine U. Ekwueme

(57) ABSTRACT

In a wireless communication system, a method for early determination of network support for Mobile IP is disclosed. A mobile node is in communication with a wireless network. Then a test is performed for a disconnect condition wherein the disconnect condition is an early indication of network non-support for Mobile IP as identified by at least a requirement for authentication. Early indication relates to identification of the non-support for Mobile IP prior to or during network packet connection. If the disconnect condition is found, the mobile node disconnects from the wireless network. If the disconnect condition is not found, the mobile node stays connected to the wireless network.

19 Claims, 10 Drawing Sheets

U.S. PATENT DOCUMENTS

| | | | |
|---|---|---|---|
| 5,101,501 | A | 3/1992 | Gilhousen et al. |
| 5,171,156 | A | 12/1992 | Nagasaka et al. |
| 5,201,665 | A | 4/1993 | McCardell et al. |
| 5,569,040 | A | 10/1996 | Sumida |
| 5,708,655 | A | 1/1998 | Toth et al. |
| 5,790,373 | A | 8/1998 | Kim et al. |
| 5,876,225 | A | 3/1999 | Katsuma et al. |
| 5,924,880 | A | 7/1999 | Watanabe et al. |
| 6,111,866 | A | 8/2000 | Kweon et al. |
| 6,193,532 | B1 | 2/2001 | Smithson |
| 6,230,012 | B1 | 5/2001 | Willkie et al. |
| 6,293,813 | B1 | 9/2001 | Johnston et al. |
| 6,349,224 | B1 | 2/2002 | Lim |
| 6,354,164 | B1 | 3/2002 | Megason et al. |
| 6,354,852 | B2 | 3/2002 | Noro et al. |
| 6,370,118 | B1 | 4/2002 | Lioy et al. |
| 6,377,556 | B1 | 4/2002 | Lioy et al. |
| 6,400,701 | B2 | 6/2002 | Lin et al. |
| 6,445,922 | B1 | 9/2002 | Hiller et al. |
| 6,471,527 | B2 | 10/2002 | Fukamachi et al. |
| 6,483,822 | B1 | 11/2002 | Lioy et al. |
| 6,515,575 | B1 * | 2/2003 | Kataoka .................... 340/5.8 |
| 6,517,364 | B2 | 2/2003 | Muramatsu et al. |
| 6,519,458 | B2 | 2/2003 | Oh et al. |
| 6,544,053 | B2 | 4/2003 | Hah et al. |
| 6,547,574 | B2 | 4/2003 | Sasaki et al. |
| 6,549,424 | B1 | 4/2003 | Beseth et al. |
| 6,625,164 | B1 | 9/2003 | Lioy et al. |
| 6,721,555 | B1 | 4/2004 | Phillips et al. |
| 6,775,553 | B1 | 8/2004 | Lioy |
| 6,804,260 | B2 | 10/2004 | Lioy et al. |
| 6,999,435 | B2 | 2/2006 | Perras |
| 7,369,529 | B2 | 5/2008 | Hsu et al. |
| 7,447,182 | B2 | 11/2008 | Chowdhury et al. |
| 2001/0016492 | A1 | 8/2001 | Igarashi et al. |
| 2002/0012433 | A1 * | 1/2002 | Haverinen et al. .......... 380/247 |

FOREIGN PATENT DOCUMENTS

| | | |
|---|---|---|
| JP | 08-190931 | 7/1996 |
| JP | 10-106665 | 4/1998 |
| JP | 10-241801 | 9/1998 |
| RU | 2172077 | 12/1996 |
| RU | 2169437 | 6/2001 |
| WO | 0051312 | 8/2000 |
| WO | WO 0076173 A1 * | 12/2000 |
| WO | 0141470 | 6/2001 |
| WO | WO 0152499 A2 * | 7/2001 |
| WO | 0176177 | 10/2001 |

OTHER PUBLICATIONS

"Wireless IP Network Standard, 3G Project," $3^{RD}$ Generation Partnership Project 2 "3GPP2," Version 3.0, Jul. 16, 2001, pp. 1-62.
International Search Report - PCTUS/2003/039587 - European Patent Office - May 7, 2004.
3GPP TS 25.211: "3rd Generation Partnership Project Technical Specification Group Radio Access Network Physical Channels and Mapping of Transport Channels Onto Physical Channels (FDD)", Release 4, V4.6.0 (Sep. 2002).
3GPP TS 25.212: "3rd Generation Partnership Project Technical Specification Group Radio Access Network Multiplexing and Channel Coding (FDD)", Release 5, V5.2.0 (Sep. 2002).
3GPP TS 25.213 V5.0.0; "3rd Generationtion Partnership Project; Technical Specification Group Radio Access Network; Spreading and Modulation", (FDD) Release 5 (Mar. 2003).
3GPP TS 25.214: "3rd Generation Partnership Project; Technical Specification Group Radio Access Network: Physica Layer Procedures" (FDD) Release 5 (Mar. 2002).
3GPP TS 25.302: "3rd Generation Partnership Project; Technical Specification Group Radio Access Network; Services Provided by the Physical Layer", Release 4, V4.4.0 (Mar. 2002).
3GPP 2 C S0002-0: "Physical Layer Standard For CDMA2000 Spread Spectrum Systems", Version 1.0, Jul. 1999.
TIA EIA IS 95: "Mobile Station Base Station Compatibility Standard for Dual Mode Wideband Spread Spectrum Cellular System", Jul. 1993.
TIA EIA IS 835: "Wifeless IP Network Standard", Jun. 2000.
TIA EIA IS 2001 A, "Interoperahiiity Specifications IOS for CDMA 2000 Access Network- Interfaces", Aug. 2001.
RFC 791 "Internet Protocol Darpa Internet Program Protocol Specification", Sep. 1981.
3GPP2 C.S0002-0: "Physical Layer Standard for CDMA2000 Spread Spectrum Systems", Version 1.0, Jul. 1999.
IEFT RFC 2002: "IP Mobility Support", The Internet Society.
Malkin, G.S., "Dial-in Virtual Private Networks Using Layer 3 Tunneling" Local Computer Networks, IEEE 1997, pp. 555-561.
RFC 791 "Internet Protocol Darpa Internet Program Protocol Specification", Sept. 1981.
Telecommunications Industry Association/Electronics Industries Association Interim Standard-95, "Mobile Station-Base Station Compatibility Standard For Dual-Mode Wideband Spread Spectrum Cellular System," Jul. 1993.
TIA EIA IS 835: "Wireless IP Network Standard", Jun. 2000.
International Search Report - PCTUS/2003/039587 - European Patent Office - May 7, 2004.
International Preliminary Examination Report, PCT/US2003/039587- International Preliminary Examining Authority - US -May 9, 2005.

* cited by examiner

SYSTEMS AND METHODS FOR EARLY DETERMINATION OF NETWORK SUPPORT FOR MOBILE IP

REFERENCE TO CO-PENDING APPLICATIONS FOR PATENT

The present Application for Patent is related to the following co-pending U.S. Patent Applications:

"SYSTEM AND METHOD FOR TRANSPARENT MOBILE IP REGISTRATION WITHIN PPP NEGOTIATION" having application No. 60/370,029, filed on Apr. 3, 2002, assigned to the assignee hereof, and expressly incorporated by reference herein; and "PPP LINK NEGOTIATION IN MOBILE IP SYSTEMS" having application No. 60/370,033, filed on Apr. 3, 2002, assigned to the assignee hereof, and expressly incorporated by reference herein.

BACKGROUND

1. Field

The present invention relates generally to the field of wireless communications, and more specifically to systems and methods for early determination of network support for Mobile IP.

2. Background

Recent advances in wireless communications and the rapid expansion of use of the Internet have greatly increased the demand for mobile computing. Code Division Multiple Access (CDMA) technology has played a critical role in meeting that demand.

CDMA is a digital Radio-Frequency (RF) technique defined in the Telecommunications Industry Association/Electronics Industries Association Interim Standard-95, referred to as "IS-95," and entitled "MOBILE STATION-BASE STATION COMPATIBILITY STANDARD FOR DUAL-MODE WIDEBAND SPREAD SPECTRUM CELLULAR SYSTEM," which was published in July 1993 and which is considered as an example of a system for application of various embodiments of the present invention.

CDMA communications devices assign a unique code to communications signals and spread those signals across a common spread-spectrum bandwidth. As long as the communications device has the correct code, it can successfully detect and select its signal from among other signals concurrently transmitted over the same bandwidth.

The increased reliability of mobile communications has led to a demand for remote wireless computing wherein a computing device, such as a laptop computer or palmtop computer, is remotely coupled to a computer network (e.g., the Internet) via the mobile telephone. Although IS-95 does not explicitly define the protocol(s) for such remote wireless computing, a number of standards exist that specify protocols and/or algorithms for such interfaces and applications. The Internet Protocol (IP) standard has been incorporated into many wireless communication devices. The standard Request For Comment No. 791 (RFC 791) entitled "INTERNET PROTOCOL DARPA INTERNET PROGRAM PROTOCOL SPECIFICATION," published in September 1981, is a network layer protocol that accommodates packetization of data for transmission. The addressing and routing information is included in packet headers. The headers contain addresses that identify the sending and receiving devices. These addresses are used by routers within the network to select a path to relay each packet to its ultimate destination at the intended destination address.

Another well-known protocol in wireless communications is the Point-to-Point Protocol (PPP), used to control wireless communications access to a computer network (e.g., the Internet). The PPP protocol is described in Request For Comment 1661 (RFC 1661), entitled "THE POINT-TO-POINT PROTOCOL (PPP)," published in July 1994. The PPP protocol specifies standards for transporting data of point-to-point links including a technique for encapsulating multi-protocol data, a Link Control Protocol (LCP) to establish and configure a data link and Network Control Protocols (NCPs) to establish and configure network-layer protocols.

Another standard, designated IETF RFC 2002: entitled "IP MOBILITY SUPPORT FOR IPv4" commonly referred to as "Mobile IP," provides communications standards, but does not address wireless aspects of mobile computing.

With the adoption of third generation (3G) standards for CDMA communication, telecommunication standards have been introduced for wireless network communication. The Telecommunication Standard designated as IS-835, entitled "CDMA 2000 WIRELESS NETWORK STANDARD," published in June 2000, and the Telecommunication Standard designated as IS-835A, published in May 2001, mandate a certain communication protocol for use with 3G CDMA devices. These standards are referred to herein as "IS-835."

There is an increasing demand for packetized data services over wireless communication systems. As traditional wireless communication systems are designed for voice communications, the extension to support data services introduces many challenges. Specifically, the deployment of the IP for mobile devices (i.e., Mobile IP) has a unique set of requirements and goals. Mobile IP is the standard for IPv4 specifically. Other methods of deploying IP on wireless networks may exist. Mobile IP deployment in a wireless communication system presents unique requirements and issues unlike problems faced in deploying IP in a non-mobile environment.

One issue with Mobile IP is the overall cost of connection time and air resources. Mobile IP registration is performed after packet network connectivity has been established. In wireless networks, air resources and connection time are costly resources, both to the provider and consumer. Problems exist in Mobile IP deployment in managing and conserving resources.

There is a need, therefore, for an efficient method for managing the resources in a wireless communication system implementing Mobile IP. Specifically, there is a need for a method of early termination or disconnect of a mobile device from a wireless network when that network does not support Mobile IP. Additionally, there is a need for a method of detecting during or prior to origination of communication that a network does not support Mobile IP.

DETAILED DESCRIPTION

Figure 1:
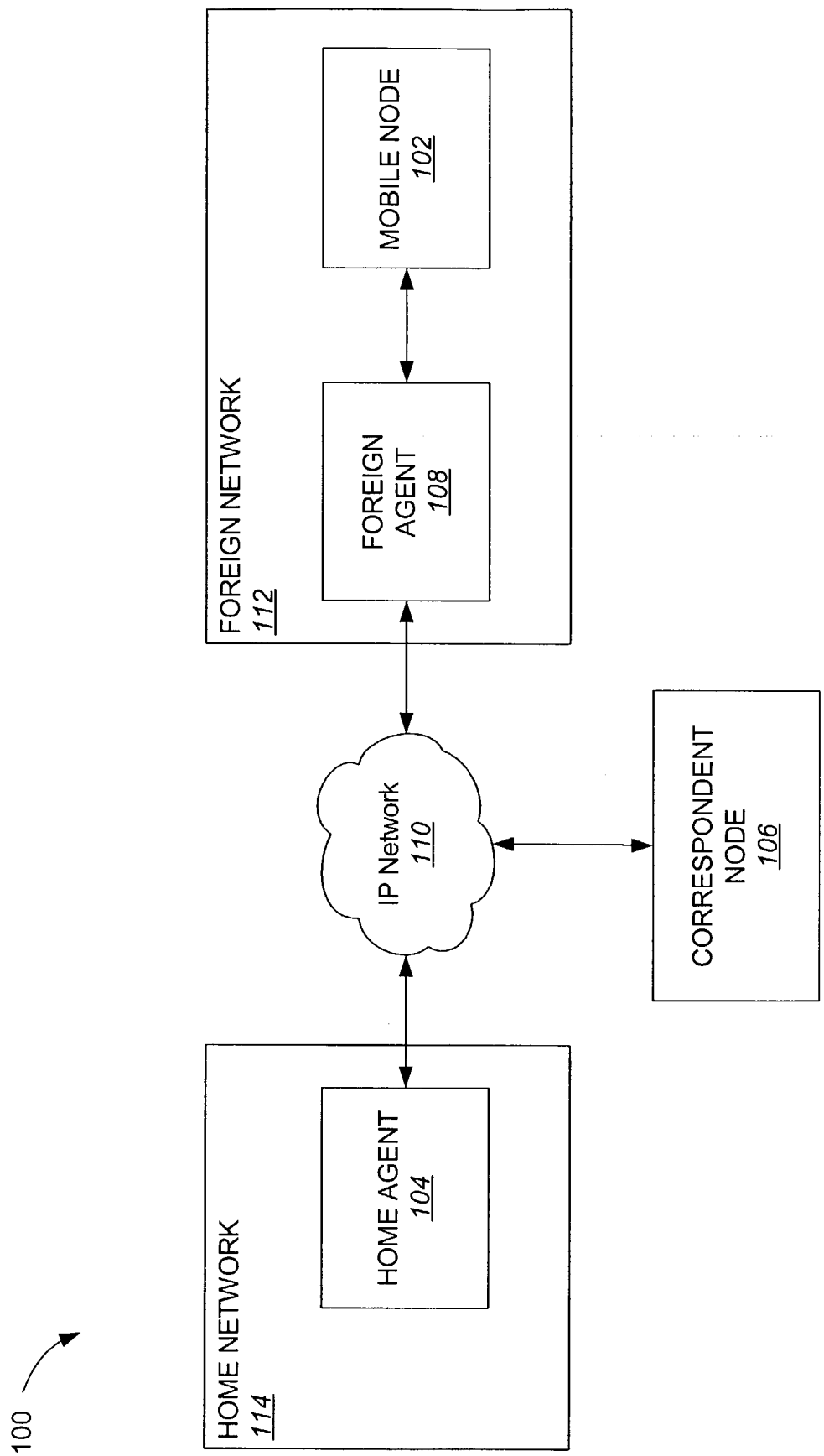
FIG. 1 is a block diagram of a communications network implementing Mobile IP to enable communications with a mobile node.

In a wireless communication system, a method for early determination of network support for Mobile IP is disclosed. Early determination refers to a determination made prior to or during origination of a communication. Such determination identifies the status of the network as to whether such network supports Mobile IP. Currently, Mobile IP registration is performed after packet network connectivity has been established. The common method first establishes the air link for packet data service between the mobile device and wireless network, then negotiates packet data connectivity via PPP 3 and finally performs Mobile IP registration. In wireless networks, air resources and connection time are costly resources, both to the provider and consumer. Therefore, the use of such resources during steps 1 and 2 is wasted if step 3 is not available. The present embodiments and method(s) described herein allow for early detection of network compatibility, i.e., does the network support Mobile IP, providing a more efficient registration mechanism. In other words, the present method(s) allow for a Mobile IP compatibility determination prior to packet network connection.

In one embodiment, a mobile node is connected to a wireless network. Then a test is performed for a disconnect condition wherein the disconnect condition is an early indication of network support for Mobile IP. If the disconnect condition is found, the mobile node disconnects from the wireless network. If the disconnect condition is not found, the mobile node stays connected to the wireless network.

The disconnect condition may be an indication of IS-835 network non-support for Mobile IP. There are a number of different disconnect conditions that may be used. For example, one disconnect condition is that before or during origination the protocol revision support by the wireless network is less than PREV 6 (discussed below). Another disconnect condition is that during LCP negotiation authentication is required by the wireless network.

A further disconnect condition is that during an IP Control Protocol (IPCP) negotiation the wireless network sends a config-not-acknowledge comprising an IP address option. Another disconnect condition is that during Mobile IP registration and before the registration request message is sent, no agent advertisement message is received by the mobile node in response to an agent solicitation message.

The early indication may be an indicator before a registration request message is sent during Mobile IP registration. In addition, the early indication may be an indicator before or during origination. The early indication may also be an indicator during LCP negotiation or during IPCP negotiation.

A mobile station for use in a wireless communication system wherein the mobile station determines network support for Mobile IP is also disclosed. The mobile station includes an antenna for receiving a wireless signal, a receiver in electronic communication with the antenna and a transmitter in electronic communication with the antenna. The mobile station also includes a processor for executing instructions and memory for storing the instructions. The instructions implement a method for early determination of network support for Mobile IP is disclosed. The mobile node is connected to a wireless network. Then a test is performed for a disconnect condition wherein the disconnect condition is an early indication of network support for Mobile IP. If the disconnect condition is found, the mobile node disconnects from the wireless network. If the disconnect condition is not found, the mobile node stays connected to the wireless network.

A wireless communication system including an embodiment of the mobile station is also disclosed. In addition to the mobile station, the wireless communication system includes an IP network and an agent in electronic communication with the IP network.

The functionality and methods disclosed herein may be embodied in a computer readable medium. The medium stores data, which includes instructions for implementing the methods and functionality described herein.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops various embodiments by first presenting a network implementing Mobile IP to communicate data to and from a mobile node. Then a spread-spectrum wireless communication system is discussed. Next, the Mobile IP network is shown implemented in the wireless communication system. Functional and logical block diagrams of a wireless link of a computing device with a computer network are shown. Finally, methods for the early determination of network support for Mobile IP are illustrated and described.

Note that one embodiment provided as an example throughout this discussion, however, alternate embodiments may incorporate various aspects without departing from the scope of the present invention. Specifically, the present invention is applicable to a data processing system, a wireless communication system, a Mobile IP network and any other system desiring efficient use and management of resources.

The present embodiment employs a spread-spectrum wireless communication system. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC.

Each standard specifically defines the processing of data for transmission from base station to mobile, and vice versa. As an example, one embodiment is detailed in the following discussion, which considers a spread-spectrum communication system consistent with the CDMA2000 standard of protocols. Alternate embodiments may incorporate another standard.

The following definitions are used throughout the following discussion and are specific to Mobile IP communications.

Home network: The network at which the mobile node seems reachable, to the rest of the Internet, by virtue of an IP address assigned to the mobile node (i.e., the home address).

Home agent: A node on the home network that effectively causes the mobile node to be reachable at the home address of the mobile node even when the mobile node is not attached to the home network.

Home address: The IP address assigned to the mobile node, making the mobile node logically appear attached to its home network.

Care-of address: An IP address at the mobile node's current point of attachment to the Internet, when the mobile node is not attached to the home network, through which the mobile's IP traffic is forwarded.

Correspondent node: A node that sends or receives a packet to a mobile node; the correspondent node may be another mobile node or a non-mobile Internet node.

Foreign agent: A mobility agent on the foreign network that can assist the mobile node in receiving datagrams delivered to the care-of address.

Foreign network: The network to which the mobile node is attached when the mobile node is not attached to its home network, and on which the care-of address is reachable from the rest of the Internet.

Redirection: A message that is intended to cause a change in the routing behavior of the receiving node.

Registration: The process by which the mobile node informs the home agent about its current care-of address.

Mobile node: A node that, as part of normal use, changes the point of attachment to the Internet.

Mobility agent: A node (typically, a router) that offers support services to mobile nodes. A mobility agent can be either a home agent or a foreign agent.

FIG. 1 is a block diagram of a communications network 100 implementing Mobile IP to enable communications with a mobile node 102. A home agent 104, a correspondent node 106 and a foreign agent 108 may all communicate with one another through an IP network 110. The mobile node 102 has an assigned home address that identifies the mobile node 102 at a foreign network 112 via the home agent 104.

The mobile node 102 may change its location from one network or subnetwork to another. In FIG. 1 the mobile node 102 is illustrated in a foreign network 112. The mobile node 102 may obtain an IP address and communicate with other nodes, including the correspondent node 106, on the IP network 110 using its IP address. The mobile node 102 obtains an IP address from the home agent 104. The IP address from the home agent 104 may be referred to as a home address. The home address is a long-term IP address on the home network 114. When the mobile node 102 is visiting a foreign network 112, a care-of address may be associated with the mobile node 102 to reflect the mobile node's current point of attachment to the IP network 110. When sending out data, the mobile node 102 typically uses its home address as the source address for IP datagrams.

The home agent 104 is in a home network 114 of the mobile node 102 and maintains the current location information for each of its mobile nodes 102. The home agent 104 stores the information necessary to forward data to the mobile nodes 102 belonging to the home network 114. This information may be stored in mobility bindings. The mobility bindings may include a number of records that include the home address, the associated care-of address, and the lifetime of that association.

The home network 114 has a network prefix that matches that of the mobile node's 102 home address. IP routing mechanisms operate to deliver IP data sent to a mobile node's 102 home address to the mobile node's 102 home network 114. The home network 114 may be a virtual network.

The foreign agent 108 is an agent in another network 112 (not the home network 114) in which the mobile node 102 is currently located. The foreign agent 108 cooperates with the home agent 104 to deliver data to the mobile node 102 when it is out of its home network 114.

It will be appreciated by those skilled in the art that one or more intervening nodes (not shown) may be in the communication path between the home agent 104 and the foreign agent 108. The intervening nodes (not shown) may be on the IP network 110 and are typically routers. Thus, as data is sent between the home agent 104 and the foreign agent 108, it travels through and is routed by one or more intervening nodes (not shown).

The network 100 in FIG. 1 may be implemented as different kinds of networks. Those skilled in the art will appreciate the various types of networks that may benefit from the inventive principles herein. One possible network in which Mobile IP and the embodiments disclosed herein may be implemented is illustrated in FIGS. 2 and 3.

Figure 2:
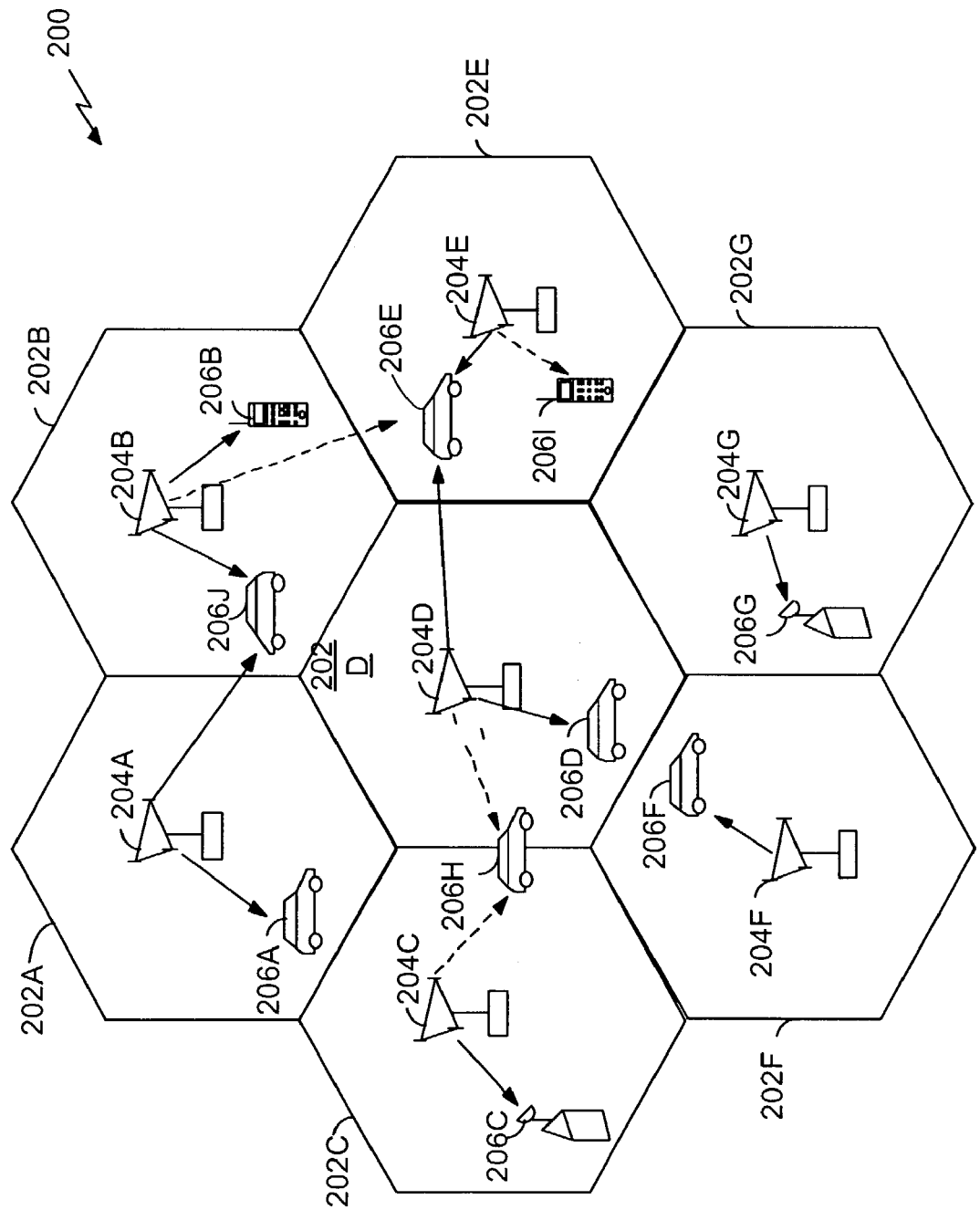
FIG. 2 is a diagram of a spread spectrum communication system that supports a number of users.
Figure 3:
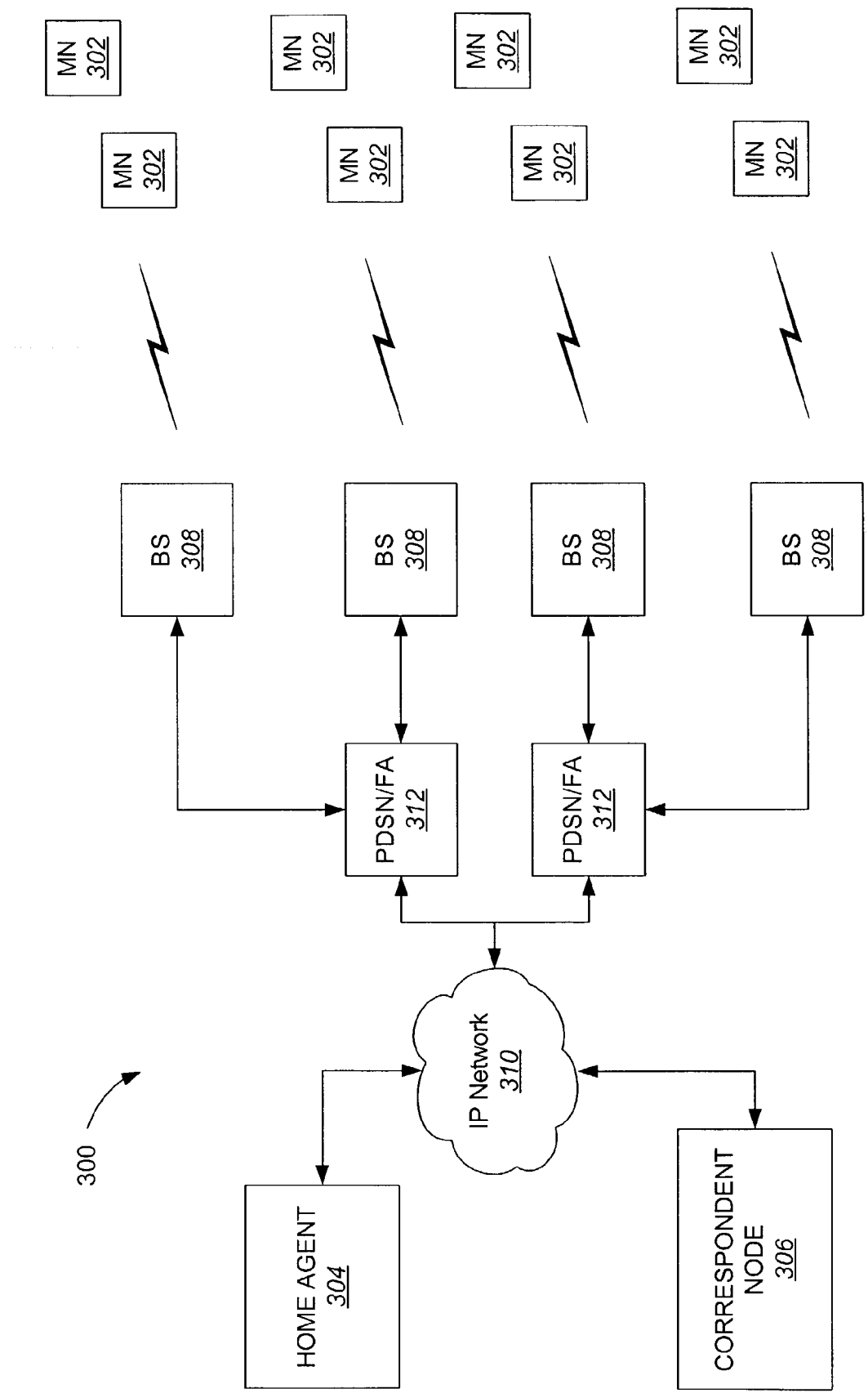
FIG. 3 is a block diagram of the communication system supporting IP data transmissions.

FIG. 2 serves as an example of a communications system 200 that supports a number of users and is capable of implementing at least some aspects of the embodiments discussed herein. Any of a variety of algorithms and methods may be used to schedule transmissions in system 200. System 200 provides communication for a number of cells 202A-202G, each of which is serviced by a corresponding base station 204A-204G, respectively. In one embodiment, some of the base stations 204 have multiple receive antennas and others have only one receive antenna. Similarly, some of the base stations 204 have multiple transmit antennas, and others have single transmit antennas. There are no restrictions on the combinations of transmit antennas and receive antennas. Therefore, it is possible for a base station 204 to have multiple transmit antennas and a single receive antenna, or to have multiple receive antennas and a single transmit antenna, or to have both single or multiple transmit and receive antennas.

Terminals 206 in the coverage area may be fixed (i.e., stationary) or mobile. The mobile terminal 206 may be a mobile node 102 as in FIG. 1. As shown in FIG. 2, various terminals 206 are dispersed throughout the system. Each terminal 206 communicates with at least one and possibly more base stations 204 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "METHOD AND SYSTEM FOR PROVIDING A SOFT HANDOFF IN A CDMA CELLULAR TELEPHONE SYSTEM," which is assigned to the assignee of the present invention.

The downlink refers to transmission from the base station 204 to the terminal 206, and the uplink refers to transmission from the terminal 206 to the base station 204. In one embodiment, some of terminals 206 have multiple receive antennas and others have only one receive antenna. In FIG. 2, base station 204A transmits data to terminals 206A and 206J on the downlink, base station 204B transmits data to terminals 206B and 206J, base station 204C transmits data to terminal 206C, and so on.

In one embodiment, the components of FIG. 1 may be used and implemented in a wireless communication system as shown in FIG. 3. IP packets or IP data may be communicated via an IP network 310 between the correspondent node 306, the home agent 304 and a mobile node (MN) 302. In this embodiment 300, a Packet Data Serving Node (PDSN) also serves as a Foreign Agent (PDSN/FA) 312. As illustrated, multiple PDSN/FAs 312 may be connected to the IP network 310. The IP network 310 may be the Internet, an intranet, a private IP network, etc. Data is transmitted as IP data packets ("IP packets") across the IP network 310. Many different kinds of data may be transmitted between a correspondent node 306 and a mobile node 302. For example, audio data, video data, textual data, electronic files, etc., may be communicated between the correspondent node 306 and the mobile node (MN) 302.

The PDSN/FA 312 receives and processes the IP data to transmit them to one or more Base Stations (BSs) 308. As shown, each PDSN/FA 312 is in electronic communication with one or more BSs 308. Once a BS 308 receives the data, it 308 then sends the data to one or more MNs 302. A MN 302 corresponds to a mobile terminal 206 of FIG. 2. Each BS 308 may serve one or more MNs 302. Typically the BS 308 serves many MNs 302.

For purposes of this disclosure, functionality provided by the BS 308 and/or functionality provided by an entity or component of the BS 308 will be referred to generally as the BS 308. It will be appreciated by those skilled in the art that, in various contexts, the use of the term BS may be referring to functionality provided by a particular entity. For example, on the IP level, the PCF (packet control function) is the entity (contained within the BS) intermediate the PDSN and MN. For the sake of explanation the more general term BS will be used.

The foregoing information describes the particular embodiment of the system 100 as applied and used in a wireless communication system 200 as shown in FIG. 2. However, it will be appreciated by those skilled in the art that the inventive principles herein may be applied to other contexts where Mobile IP may be deployed.

Figure 4:
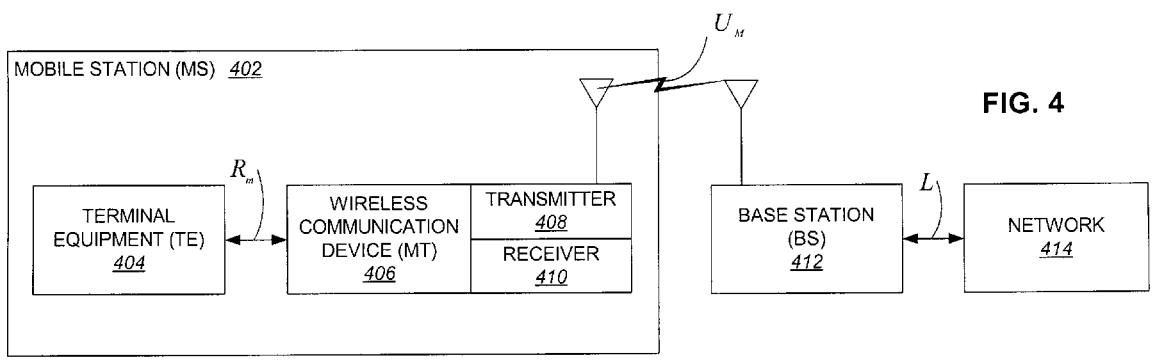
FIG. 4 is a functional block diagram of wireless link of a computing device with a computer network.

FIG. 4 is a functional block diagram illustrating a wireless computer network connection of a mobile station (MS) 402. An MS 402 is a type of a mobile node 302 discussed above. In FIG. 4 terminal equipment (TE) 404 may be a laptop, palmtop, or other computing device. The TE 404 is coupled to a wireless communication device, such as a mobile telephone (MT) 406. The TE 404 communicates with the MT 406 via a connection designated by standards as an $R_m$ interface. The $R_m$ interface may be implemented by a variety of technologies. For example, the $R_m$ interface could be implemented via conventional interfaces such as RS-232, RS-422, IEEE 4888, IEEE 1394, BLUETOOTH® Technology, or the like. Note that BLUETOOTH® is a registered trademark of BLUETOOTH SIG, INC. CORPORATION BY ASSIGNMENT DELAWARE 1301 K STREET, NW, SUITE 600 EAST TOWER C/O SONNENSCHEIN NATH & ROSENTHAL WASHINGTON D.C. 20005. Some of these conventional interface technologies are well known in the art and need not be described herein. The disclosed embodiments are not limited by the specific form of the $R_m$ interface. Note that alternate type interfaces may also be implemented. Additionally, the various components and functions of MS 402 may be incorporated into one device or one chip. For example, a single device may include the computing portions as well as the radio portions. Alternately, the various modules and functions described may be incorporated within each other or provided as individual components.

The TE 404 and MT 406 may conveniently be collectively characterized as a mobile station (MS) 402. The MT 406 includes a transmitter 408 and receiver 410 that operate in a known fashion to permit voice or data communications with a remote location.

The wireless communication system of FIG. 4 also includes a base station (BS) 412, which may also comprise a mobile switching center (MSC). The BS 412 communicates with the MS 402 via a wireless interface, designated by standards as an $U_m$ interface. Operational details of the $U_m$ interface are known to those of ordinary skill in the art and need not be described in greater detail herein. The BS 412 is coupled to a computer network 414 via an interface, designated by standards as an L interface. Operational details of the L interface are also designated by industry standards and need not be described in greater detail herein.

To establish a communication link between the TE 404 and the network 414, communication data packets are exchanged via the $R_m$ and $U_m$ interfaces and a PPP session is established. The various protocols and standards described above provide a framework for implementing a wireless computer network connection. The actual implementation of hardware and software within that framework is left to the discretion of the designer. While the various standards described above provide for such Mobile IP registration, the overlapping standards often result in inefficiencies in the registration process. Therefore, it can be appreciated that there is a significant need for an optimized registration process for mobile computing applications. The disclosed embodiments provide this, and other advantages, as will be apparent from the detailed description and accompanying figures.

The embodiments herein are directed to more efficient registration mechanisms for Mobile IP registration. As discussed above with respect to FIG. 4, the goal is to register mobile terminal equipment (e.g., the TE 404) with a computer network (e.g., the network 414), such as the Internet.

As noted above, a number of different standards exist to govern wireless IP communication. These standards may be implemented in a number of different ways to provide some flexibility to the designer. FIG. 4 illustrates the simplified general wireless network that supports the communication process.

Figure 5:
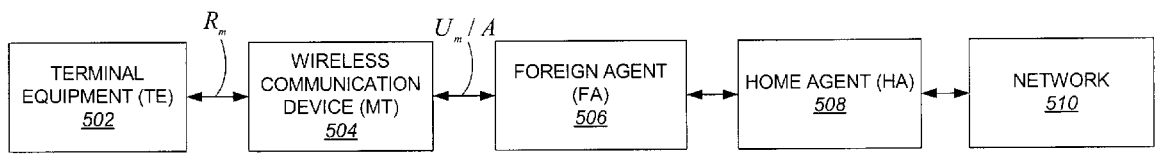
FIG. 5 illustrates a logical connection between a computing device and a Mobile IP network using a wireless system similar to that of FIG. 4.

The communication process between the TE 404 and the network 414 is illustrated at an IP communication layer in the functional block diagram of FIG. 5. As previously discussed, the TE 502 communicates with the MT 504 via the $R_m$ interface. In turn, the MT 504 communicates with a Foreign Agent (FA) 506 via the $U_m$/A interface. The "A interface" illustrated in FIG. 5 refers collectively to the A8, A9, A10, and A11 interfaces that comprise the BS/MSC to PDSN connection, such as in an IS-835 network as specified in TIA/EIA-2001-A entitled "INTEROPERABILITY SPECIFICATIONS (IOS) FOR CDMA 2000 ACCESS NETWORK INTERFACES," which was published in August 2001 and which is incorporated herein by reference. Note that the term "A interface" is not standardized. Other interfaces (such as A1-A11) are defined in IS-835, but are directed to interfaces involving the BS/MSC and are extraneous to an understanding of the present system. Those skilled in the art will recognize that the A interface refers to one or more interfaces defined in IS-835. In accordance with some communication standards the MT 504 may communicate with a peer, such as the Packet Data Serving Node (PDSN) described in IS-835, which is, in one embodiment, associated with the FA 506.

It should be noted that the BS 412 is not illustrated in FIG. 5 since it essentially functions as a transparent relay mechanism at the network level. The BS 412 typically does not play a role in communication at the IP layer level. The FA 506 serves as a roaming connection point between the TE 502 and the network 510. If the MT 504 performs a handoff (i.e., switches to a different BS), the FA 506 may also change. Thus, as the MT 504 moves, it corresponds with the local FA 506.

The FA 506 communicates with a Home Agent (HA) 508. The FA 506 and HA 508 are both processes specified for Mobile IP communication. The HA 508 acts as a broker of data in a communication link between the FA 506 and the network 510. The HA 508 is a fixed point and has the specified IP address used by the network 510. Even as the MT 504 is handed off to a different BS, the HA 508 remains fixed throughout the IP session between the TE 502 and the network 510.

As stated earlier, Mobile IP registration is performed after packet network connectivity has been established. In wireless networks, air resources and connection time are costly resources, both to the provider and consumer. The disclosed systems and methods allow for early detection of a network that will not support Mobile IP, providing a more efficient registration mechanism. One common method for registration is to (1) establish the air link for packet data service between the mobile device and wireless network, (2) negotiate packet data connectivity via PPP, and (3) perform Mobile IP registration. There are several indicators during the course of this common method on an IS-835 network that indicate that the network will not support Mobile IP, allowing the Mobile Node to abandon its connection attempt.

Figure 6:
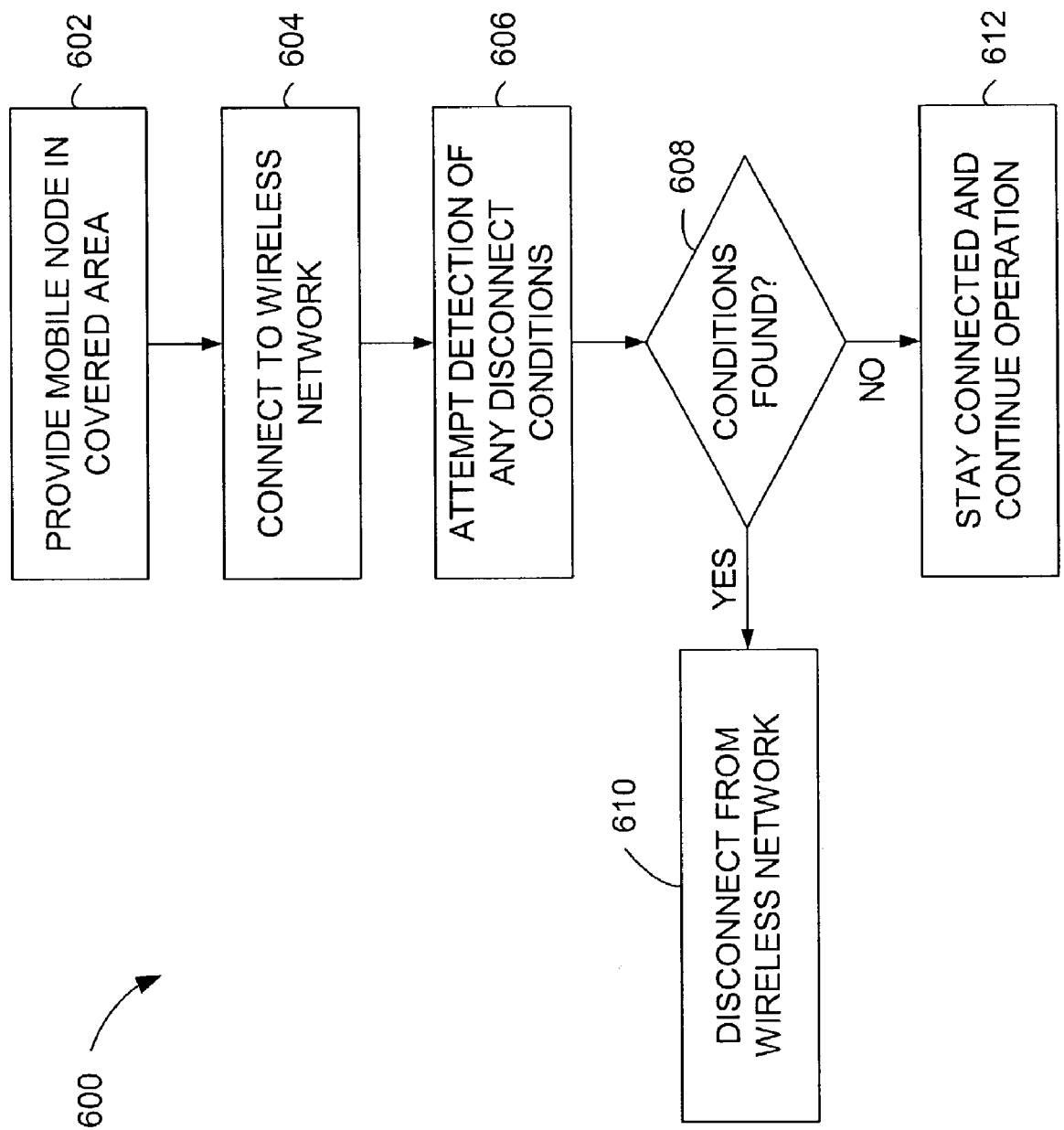
FIG. 6 illustrates a flow diagram for early determination of network support for Mobile IP.

FIG. 6 is a flow diagram illustrating a general method 600 for the early determination of IS-835 network support for Mobile IP. The mobile node is provided 602 in a covered area. Then the mobile node connects 604 to a wireless network. The mobile node, in order to perform an early detection of a network that will not support Mobile IP, then attempts 606 to detect early disconnect conditions. An early disconnect condition is any condition that can be detected by the mobile node which will allow the mobile node to determine whether the wireless network supports Mobile IP. The mobile node then determines 608 whether any of the disconnect conditions have been met. If one of the disconnect conditions are met, the mobile node disconnects 610 from the wireless network. If none of the disconnect conditions are met, then the mobile node stays 612 connected to the wireless network and continues operation.

Disconnect Conditions

There are many different disconnect conditions that may be used. For example, the following disconnect conditions may be used: (1) before or during origination; the protocol revision supported by the network is less than PREV 6, (2) during LCP negotiation; if authentication (CHAP or PAP) is required by the network, (3) during IPCP negotiation; if the network sends a Config-not-acknowledge (C-NAK) containing the IP address option, and (4) during Mobile IP registration, before the registration request is sent, if no agent advertisement messages are received in response to agent solicitation messages. The following description and figures will be used to discuss each one of these possible disconnect conditions.

Example Scenarios

Figure 7:
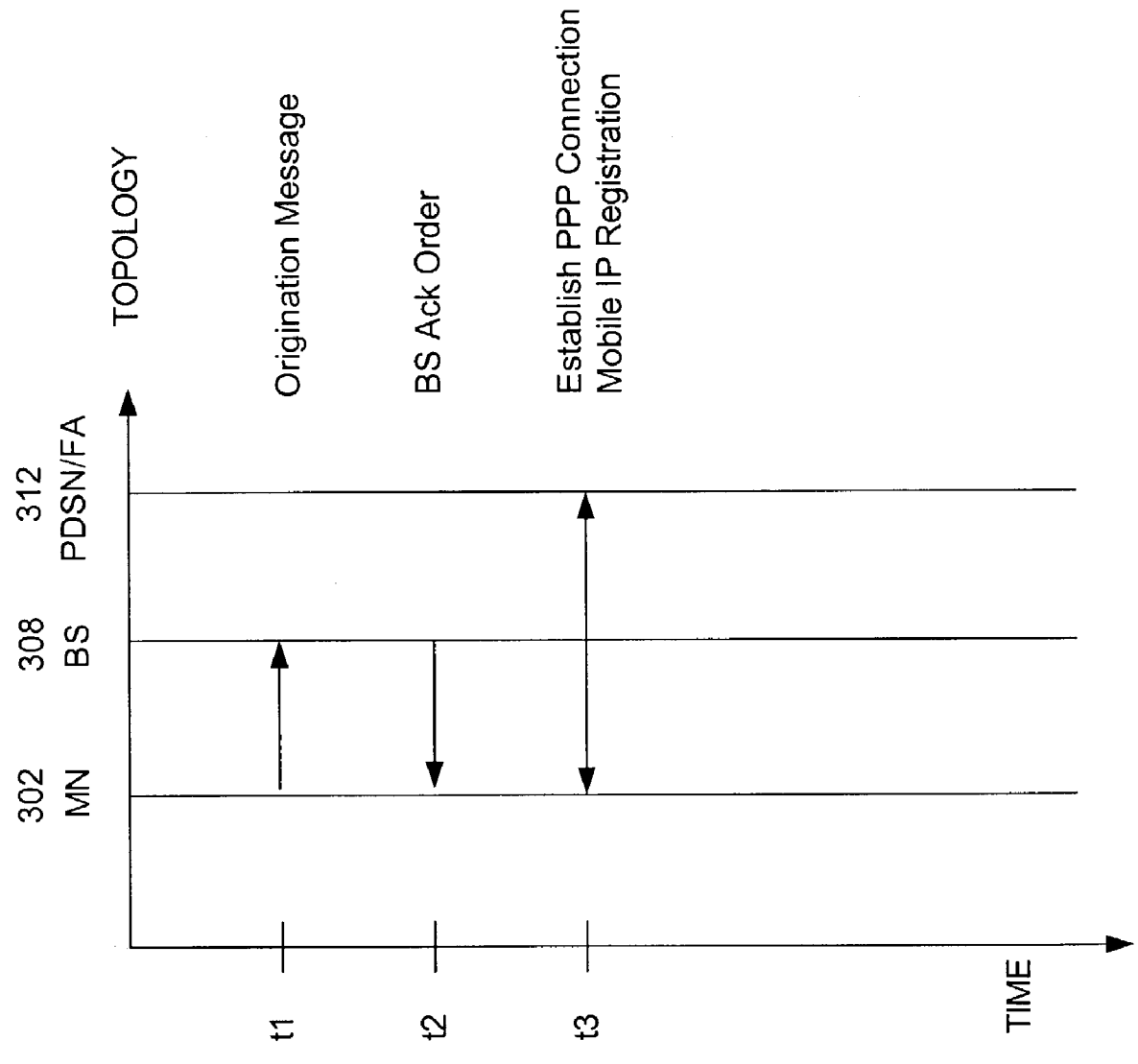
FIG. 7 illustrates signal flow associated with an origination message from a mobile node in a wireless communication system topology.

FIG. 7 illustrates a flow diagram of one possible disconnect condition for early determination of network support for Mobile IP. In order to obtain packet data services, the mobile 302 performs registration with the serving wireless network and then with the packet network. The mobile node 302 sends an Origination Message at time t1 to the BS 308 that includes the packet data service option. The BS 308 acknowledges the receipt of the Origination Message with a Base Station Acknowledgement Order (BS Ack Order) to the MS 302 at time t2. The Origination Message results in assignment of the traffic channel, establishment of the A10 connection, establishment of the link layer (PPP) and for the case where Mobile IP is used by the terminal, Mobile IP registration with the serving packet network, indicated at time t3. Additional details and messages known by those skilled in the art and defined by various CDMA and Mobile IP specifications are not shown in FIG. 7. One disconnect condition for early determination of network support for Mobile IP is that before or during origination the mobile station 302 or mobile node 102 discovers that the protocol revision supported by the network is less than PREV (Protocol Revision) 6. In CDMA, the term PREV 6 indicates the level of protocol support in the BS as per IS-2000 and earlier standards. When the mobile node 302 detects this disconnection condition, it drops the connection to the wireless network, freeing air resources and minimizing the connection time. This corresponds to the disconnect condition (1) given hereinabove.

Figure 8:
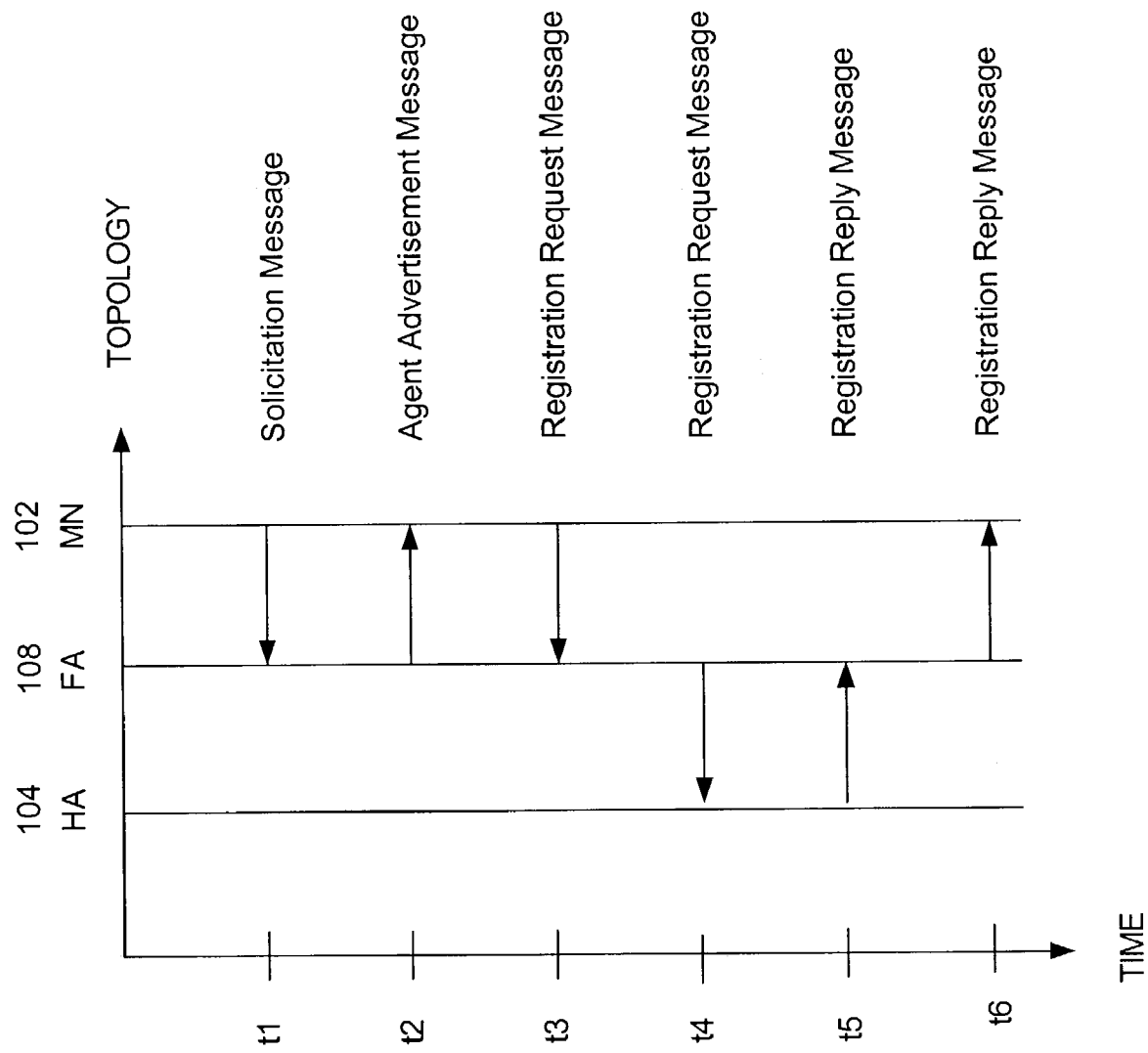
FIG. 8 illustrates signal flow associated with registering a mobile node with a home agent in a wireless communication system topology.

FIG. 8 illustrates a flow diagram of another possible disconnect condition for early determination of network support for Mobile IP. FIG. 8 shows the foreign agent (FA) 108 advertising after being prompted to advertise by the mobile node (MN) 102. The horizontal axis represents the topology of the system, i.e., infrastructure elements. The vertical axis represents the time line.

A mobile node 102 may solicit an agent advertisement message by sending a solicitation message at time t1. At time t2 the foreign agent (FA) 108 sends an agent advertisement message. The mobile node (MN) 102 receives the agent advertisement and determines whether the mobile node 102 is on its home network 114 or on a foreign network 112. In the example shown by FIG. 8, the mobile node 102 determines that it is on a foreign network 112. In addition, the mobile node 102 may obtain a care-of address from the agent advertisement message. The care-of address is typically the IP address of the foreign agent 108. The mobile node 102 then registers the new care-of address with its home agent (HA) 104. The mobile node 102 may register the new care-of address with its home agent 104 by sending a registration request message to the foreign agent 108 at time t3. Additional processing may be performed by the foreign agent 108 at this time, including but not limited to: MS authentication, replay protection, dynamic home agent address resolution, etc. The foreign agent 108 then forwards the registration request message to the home agent 104 at time t4.

At time t5 the home agent (HA) 104 replies by sending a registration reply message to the foreign agent (FA) 108, which forwards this message to the mobile node (MN) 102 at time t6. The registration reply message indicates to the mobile node 102 whether the home agent 104 accepted the registration or not. If the home agent 104 accepts the registration, the home agent 104 provides a corresponding IP address to the mobile node 102 and sends the IP address to the mobile node 102 in the registration reply message.

The disconnect condition for early determination of network support for Mobile IP illustrated in FIG. 8 is that during Mobile IP registration, no Agent Advertisement Message is received in response to the Solicitation Message. As shown by FIG. 8, this is determined before the Registration Request Message is sent. This corresponds to disconnect condition (4) given hereinabove.

The Internet Control Message Protocol (ICMP), as defined in RFC 792, which is incorporated herein by reference, may be used in sending messages with the embodiments disclosed herein. In addition, ICMP Router Discovery, defined in RFC 1256 which is incorporated herein by reference, may be used in the discovery of an agent, whether a home agent 104 or a foreign agent 108.

Additional disconnect conditions will be discussed in relation to the embodiment shown in FIG. 4. Recall that FIG. 4 is a functional block diagram illustrating a wireless computer network connection of a mobile station (MS) 402. An MS 402 is a type of a mobile node discussed herein.

Figure 9:
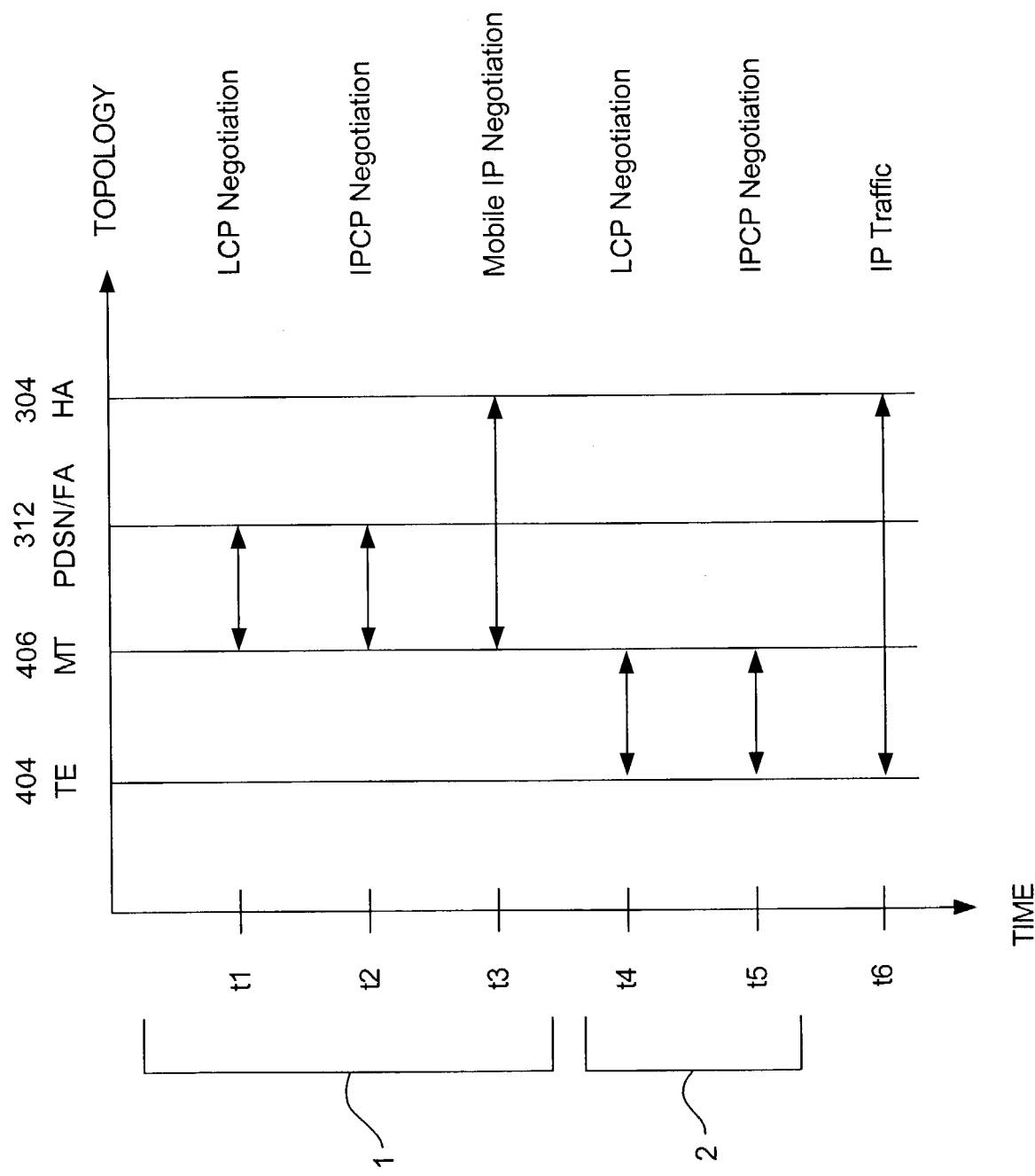
FIG. 9 illustrates signal flow associated with negotiating a wireless communication link using the system of FIG. 5.

The system illustrated in FIG. 4 illustrates the entities involved in Mobile IP registration. FIG. 9 illustrates the flow of messages back and forth between the various components of the system. The terminal equipment (e.g., the TE 404 of FIG. 4) is indicated at the left of FIG. 9 while the network (e.g., the network 414 of FIG. 4) is indicated at the right of FIG. 9. Intermediate the terminal equipment and the network is the mobile terminal (e.g., the MT 406 of FIG. 4), indicated by the designation MT. Also illustrated in FIG. 9 is the PDSN/FA 312 and the HA 304. Those skilled in the art will recognize that communications flow between the MT 406 and the network 510 via the BS 308. However, some portion of the process illustrated in FIG. 9 is described at the network layer and not the physical link layer. Thus, for the sake of convenience, FIG. 9 illustrates communications between the MT 406 and the PDSN/FA 312 over the $U_m$ interface.

In FIG. 9, the process indicated by reference numeral 1 is the PPP session establishment and Mobile IP registration process that occurs between the MT 406 and the PDSN/FA 312. This process includes Link Control Protocol (LCP) negotiation and IP Control Protocol (IPCP) negotiation. Those skilled in the art will appreciate that a number of messages may flow back and forth between the MT 406 and the FA 312 for both the LCP negotiation and the IPCP negotiation. Messages are transmitted from the MT 406 using the transmitter within the wireless communication device while the receiver within the wireless communication device receives negotiation messages. For the sake of clarity, only selected messages that are closely related to Mobile IP registration are illustrated in FIG. 9. During this process, a PPP session is established on the $U_m$ interface. The MT 406 performs a Mobile IP registration on the $U_m$ interface and is assigned an IP address.

In a subsequent process, indicated by reference numeral 2 in FIG. 9, PPP session negotiation, i.e. IP connectivity establishment, of the TE 404 occurs in communications with the MT 406. During this process, a second PPP session occurs on the $R_m$ interface. Those skilled in the art will recognize that a number of messages are transmitted back and forth between the TE 404 and the MT 406 for both the LCP negotiation and the IPCP negotiation. For the sake of brevity, those individual messages are not illustrated in FIG. 9.

The MT 406 furnishes the TE 404 with the previously assigned IP address. The protocol options between the different PPP sessions may differ. The subsequent Mobile IP negotiations are transparent. Subsequent IP traffic occurs between the TE 404 and the network 510 via the MT 504 and the BS 412 as indicated in FIG. 4. The process illustrated in FIG. 9 conforms to the multiple communication standards and will ultimately result in the proper IP address assignment.

Additional disconnect conditions may be found in the LCP negotiation and in the IPCP negotiation shown in FIG. 9. One additional disconnect condition is during LCP negotiation, if authentication (CHAP or PAP) is required by the network, then the mobile node may determine that there is no IS-835 network support for Mobile IP and disconnect from the wireless network. This corresponds to the disconnect condition (2) as given hereinabove. One authentication protocol is the Challenge Handshake Authentication Protocol (CHAP). Another authentication protocol is the Password Authentication Protocol (PAP). The PDSN 312 may support both of the authentication mechanisms (CHAP and PAP). Only if the PDSN requires either CHAP or PAP will the disconnect condition be met.

The network may indicate that CHAP is required by i) sending multiple LCP Configure-Requests including the Authentication Protocol (AP) option indicating CHAP authentication, or ii) terminating the PPP negotiation upon receipt of LCP Configure-Reject of the AP option indicating CHAP from the Mobile Station. The network may indicate that PAP is required by i) sending multiple LCP Configure-Requests including the Authentication Protocol (AP) option indicating PAP authentication or ii) terminating the PPP negotiation upon receipt of LCP Configure-Reject of the AP option indicating PAP from the Mobile Station.

In LCP, the Authentication Protocol (AP) option may be negotiated, including the AP value, which indicates the method of authentication (i.e. CHAP, PAP, among others). Thus to propose CHAP or PAP, the PDSN sends a LCP Configure-Request (C-REQ) including the AP option with value equal to CHAP or PAP. The mobile may indicate back to the PDSN that it will not perform authentication by sending a LCP Configure-Reject (C-REJ) including the rejected AP option and option value (CHAP or PAP). Otherwise the mobile may indicate back to the PDSN that it does not wish to perform authentication by sending a LCP Configure-Not-Acknowledge (C-NAK) including the rejected AP option and option value (CHAP or PAP). In this case, the PDSN may re-propose the disputed option in a later C-REQ. There are multiple sequences of exchanged LCP messages possible at this time in accordance with the PPP specification, the implications of which are known to those versed in the art. The final result of LCP negotiation is expressed by the options contained in the concluding Configure-Acknowledgement (C-ACK) message sent by the MS to the PDSN. Provided the MN indicates CHAP and/or PAP are not supported via LCP C-REJ mechanism, the mobile may make the early determination that Mobile IP is not supported by the network.

A further disconnect condition may be found in the IPCP negotiation shown in FIG. 9. If IPCP IP address option is negotiated during IPCP, then the mobile node may determine that there is no IS-835 network support for Mobile IP and disconnect from the wireless network. This corresponds to disconnect condition (3) as given hereinabove.

Figure 10:
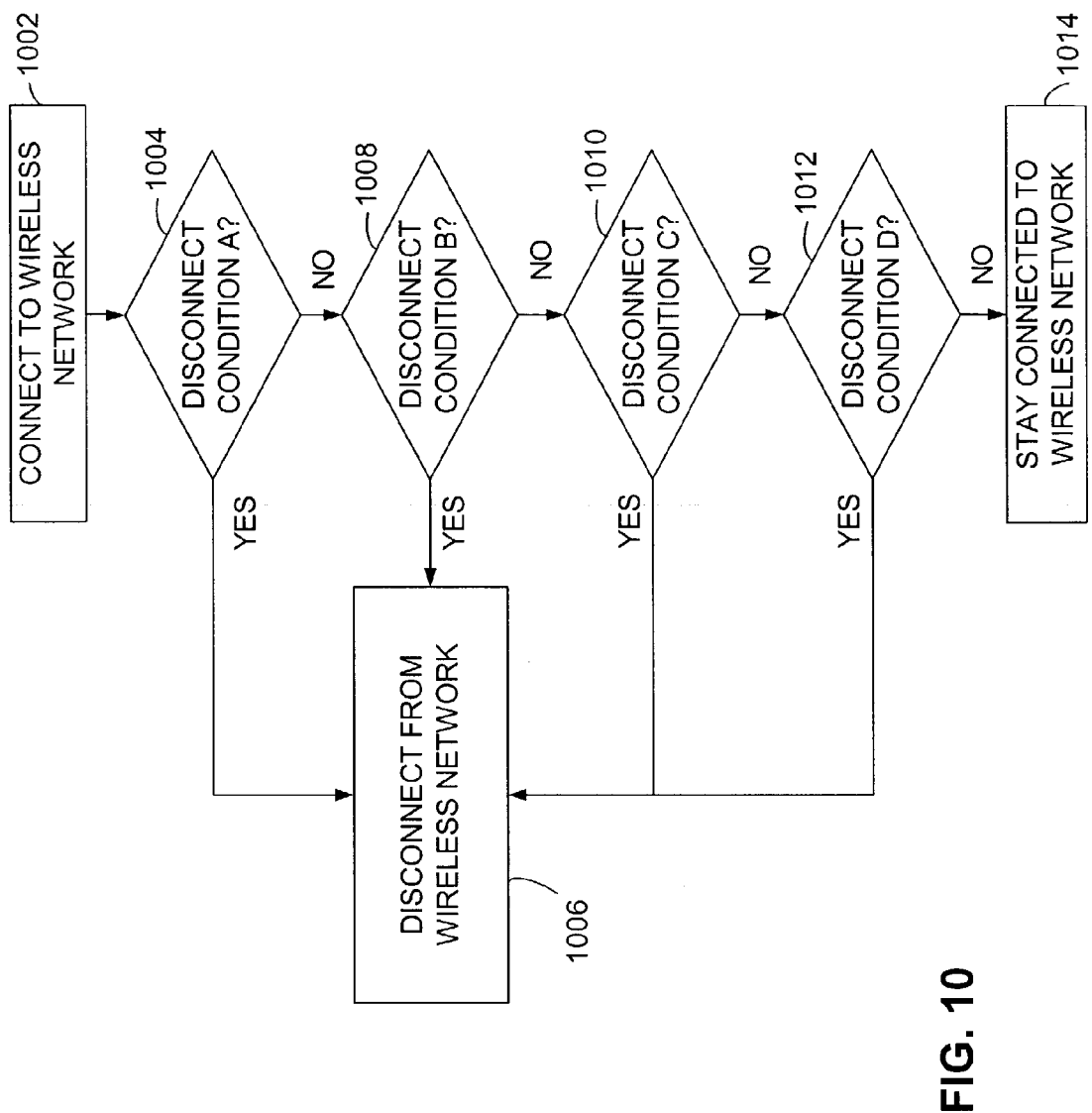
FIG. 10 illustrates a flow diagram for early determination of network support for Mobile IP.

FIG. 10 is a flow diagram illustrating a method for the early determination of IS-835 network support for Mobile IP. The mobile node connects 1002 to a wireless network. The mobile node, in order to perform an early detection of a network that will not support Mobile IP, attempts to detect early disconnect conditions. As discussed above, there are many different disconnect conditions that may be used. The mobile may determine 1004 whether, before or during origination; the protocol revision supported by the network is less than PREV 6 (referred to as Disconnect Condition A in FIG. 10). If Disconnect Condition A is met, the mobile node disconnects 1006 from the wireless network. If this disconnect condition is not met, then the mobile node stays connected to the wireless network and continues operation and also determines whether any other disconnect conditions exist.

The mobile may then determine 1008 whether authentication (CHAP or PAP) is required by the network, (referred to as Disconnect Condition B in FIG. 10) during LCP negotiation. If Disconnect Condition B is met, the mobile node disconnects 1006 from the wireless network. If this disconnect condition is not met, then the mobile node stays connected to the wireless network and continues operation and also determines whether any other disconnect conditions exist.

The next disconnect condition may be tested when the mobile determines 1010 whether, during IPCP negotiation, the network sends a Config-not-acknowledge (C-NAK) containing the IP address option, (referred to as Disconnect Condition C in FIG. 10). If Disconnect Condition C is met, the mobile node disconnects 1006 from the wireless network. If this disconnect condition is not met, then the mobile node stays connected to the wireless network and continues operation and also determines whether any other disconnect conditions exist.

The mobile may then determine 1012 whether, during Mobile IP registration and before the registration request is sent, no agent advertisement messages are received in response to agent solicitation messages, (referred to as Disconnect Condition D in FIG. 10). If Disconnect Condition D is met, the mobile node disconnects 1006 from the wireless network. If this disconnect condition is not met, then the mobile node stays connected 1014 to the wireless network and continues operation. If none of the disconnect conditions are met, the mobile may assume IS-835 network support for Mobile IP (unless or until it discovers otherwise).

Figure 11:
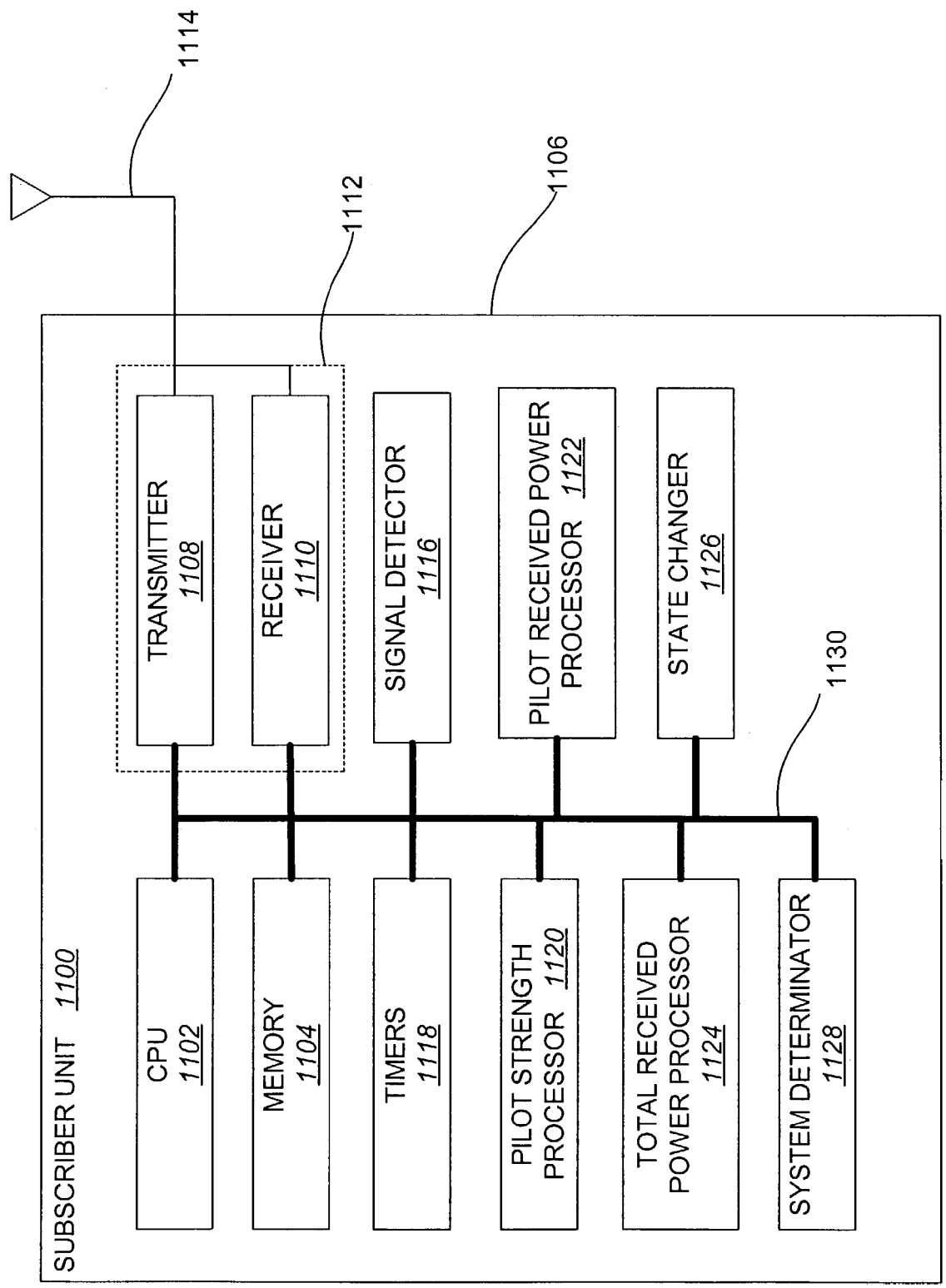
FIG. 11 illustrates a block diagram of certain components in an embodiment of a subscriber unit.

An embodiment of a mobile node 102, 302 is shown in a subscriber unit system 1100 illustrated in the functional block diagram of FIG. 11. The system 1100 includes a central processing unit (CPU) 1102 which, controls operation of the system 1100. The CPU 1102 may also be referred to as a processor 1102. Memory 1104, which may include both read-only memory (ROM) and random access memory (RAM), provides instructions and data to the CPU 1102. A portion of the memory 1104 may also include non-volatile random access memory (NVRAM).

The system 1100, which is typically embodied in a wireless communication device such as a cellular telephone, also includes a housing 1106 that contains a transmitter 1108 and a receiver 1110 to allow transmission and reception of data, such as audio communications, between the system 1100 and a remote location, such as a cell site controller or base station 308. The transmitter 1108 and receiver 1110 may be combined into a transceiver 1112. An antenna 1114 is attached to the housing 1106 and electrically coupled to the transceiver 1112. The operation of the transmitter 1108, receiver 1110 and antenna 1114 is well known in the art and need not be described herein. Further, the transmitter 1108, receiver 1110 and antenna 1114 correspond to the transmitter 408, receiver 410 and antenna illustrated in FIG. 4.

The system 1100 also includes a signal detector 1116 used to detect and quantify the level of signals received by the transceiver 1112. The signal detector 1116 detects such signals as total energy, pilot energy per Pseudorandom Noise (PN) chips, power spectral density, and other signals, as is known in the art. Various indicators and values are calculated by the signal detector 1116 for use in the system 1100, as described in further detail below.

A set of timers 1118 works in conjunction with a pilot strength processor 1120, a pilot received power processor 1122, and a total received power processor 1124. By measuring the levels of the signals received and processing these signals, the system 1100 can determine the quality of the communication channel between the wireless communication device and its base station 308.

The pilot strength processor 1120 receives a pilot strength indicator (Ec/Io) from the signal detector 1116. The signal detector 1116 divides the ratio of pilot energy per PN chip (Ec) by the total power spectral density received at the transceiver 1112 (Io). This ratio of pilot energy to overall received energy is called "pilot strength," as is known in the art. Also as known in the art, the pilot strength depends on loading conditions of an active cell and adjacent cells, and thus is an indication of traffic load in a particular cell.

The total received power processor 1124 uses a variable Rx that is detected and quantified at the signal detector 1116. The total received power (Rx) is a measure of all power received at the transceiver 1112. It includes thermal noise, interference from other callers and a pilot signal transmitted to that particular transceiver 1112. A total of all this energy received is stored to indicate the total received power.

The pilot received power processor 1122 receives a Received Signal Strength Indicator (RSSI) from the signal detector 1116. The RSSI indicates the pilot received power and, in one embodiment, is calculated by adding the total received power (Rx) with the (Ec/Io), as is known in the art. The RSSI is independent of system loading and variation in the RSSI indicates forward link path loss changes. These path loss changes are important in determining when to switch service, described in detail below.

A state changer 1126 of the system 1100 controls the state of the wireless communication device based on a current state and additional signals received by the transceiver 1112 and detected by the signal detector 1116. The wireless communication device is capable of operating in any one of a number of states.

The system 1100 also includes a system determinator 1128 used to control the wireless communication device and determine which service provider system the wireless communication device should transfer to when it determines the current service provider system is inadequate.

The various components of the system 1100 are coupled together by a bus system 1130 which may include a power bus, a control signal bus, and a status signal bus in addition to a data bus. However, for the sake of clarity, the various busses are illustrated in FIG. 11 as the bus system 1130. One skilled in the art will appreciate that the system 1100 illustrated in FIG. 11 is a functional block diagram rather than a listing of specific components. For example, although the pilot strength processor 1120, pilot received power processor 1122, and the total received power processor 1124 are illustrated as three separate blocks within the system 1100, they may in fact be embodied in one physical component, such as a digital signal processor (DSP). They may also reside as program codes in the memory 1104 and operated on by the CPU 1102. The same considerations apply to the other components listed in system 1100 of FIG. 11.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. One embodiment of a storage medium is coupled to the processor such the processor can read information from, and write information to, the storage medium. In the alternative, the storage medium may be integral to the processor. The processor and the storage medium may reside in an ASIC. The ASIC may reside in a user terminal. In addition, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a mobile node configured for communication in a wireless communication system, the method comprising:
    connecting the mobile node, via a processor in the mobile node, to a wireless network;
    testing for satisfaction of any disconnect condition of a plurality of disconnect conditions, wherein each disconnect condition of the plurality of disconnect conditions is an early indication of network support for Mobile IP, wherein the step of testing comprises determining whether authentication is required by the wireless network during Link Control Protocol (LCP) negotiation, wherein determining whether authentication is required comprises indicating to the wireless network that the mobile node will not perform authentication, and wherein the step of testing is performed prior to packet network connection between the mobile node and the wireless network; and
    disconnecting from the wireless network without performing authentication if authentication is required by the wireless network during LCP negotiation.

2. The method as in claim 1, wherein the step of determining comprises detecting a request for Challenge Handshake Authentication Protocol (CHAP) authentication.

3. The method as in claim 1, wherein the step of determining comprises detecting a request for Password Authentication Protocol (PAP) authentication.

4. The method as in claim 1, wherein the step of testing further comprises detecting receipt from the wireless network of a config-not-acknowledge comprising an IP address option during IPCP negotiation, the method further comprising disconnecting from the wireless network in response to the receipt of the config-not-acknowledge.

5. The method as in claim 1, wherein the step of testing further comprises:
    determining if the protocol version supported by the wireless network is compatible with a predetermined protocol version supporting Mobile IP.

6. The method as in claim 1, further comprising:
    sending an agent solicitation message during Mobile IP registration;
    wherein the step of testing further comprises detecting no receipt of an agent advertisement message during a predetermined time period after sending the agent solicitation message, wherein detecting no receipt satisfies a disconnect condition.

7. A mobile station for use in a wireless communication system wherein the mobile station determines network support for Mobile IP, the mobile station comprising:
    an antenna for receiving a wireless signal;
    a receiver in electronic communication with the antenna;
    a transmitter in electronic communication with the antenna;
    a processor for executing instructions; and
    memory for storing the instructions, wherein the instructions are executable by the processor for:
        connecting to a wireless network;
        testing for satisfaction of any disconnect condition of a plurality of disconnect conditions, wherein each disconnect condition of the plurality of disconnect conditions is an early indication of network support for Mobile IP, wherein testing comprises determining if an authentication is required by the wireless network during Link Control Protocol (LCP) negotiation, wherein determining if the authentication is required comprises indicating to the wireless network that the mobile node will not perform authentication, and wherein the step of testing is performed prior to packet network connection between the mobile node and the wireless network; and
        disconnecting from the wireless network without performing authentication if the authentication is required by the wireless network during Link Control Protocol (LCP) negotiation.

8. The mobile station as in claim 7, wherein testing further comprises:
determining if the protocol version supported by the wireless network is compatible with a predetermined protocol version supporting Mobile IP.

9. The mobile station as in claim 7, wherein the authentication is CHAP.

10. The mobile station as in claim 7, wherein the authentication is PAP.

11. The mobile station as in claim 7, wherein testing further comprises detecting receipt from the wireless network of a config-not-acknowledge comprising an IP address option during IPCP negotiation, and wherein the instructions are also executable for disconnecting from the wireless network in response to the receipt of the config-not-acknowledge.

12. The mobile station as defined in claim 7, wherein the instructions further implement:
sending an agent solicitation message during Mobile IP registration; and
testing further comprises detecting no receipt of an agent advertisement message during a predetermined time period after sending the agent solicitation message, wherein detecting no receipt satisfies a disconnect condition.

13. A mobile node adapted to communicate in a wireless network supporting Internet Protocol (IP), the mobile node comprising:
a processor for executing instructions; and
memory for storing the instructions, wherein the instructions test for a plurality of disconnect conditions, wherein at least one disconnect condition of the plurality of disconnect conditions is evaluated prior to packet network connection, wherein the disconnect conditions of the plurality of disconnect conditions identify network non-support for Mobile IP, wherein the at least one disconnect condition includes determination of an authentication requirement for the wireless network during Link Control Protocol (LCP) negotiation, wherein determining the authentication requirement comprises indicating to the wireless network that the mobile node will not perform authentication, wherein the instructions disconnect the mobile node from the wireless network without performing authentication if any disconnect condition of the plurality of disconnect conditions is found.

14. The mobile node as in claim 13, wherein the instructions detect a request for Challenge Handshake Authentication Protocol (CHAP) authentication and disconnect the mobile node from the wireless network if the request for CHAP authentication is detected.

15. The mobile node as in claim 13, wherein the instructions detect a request for Password Authentication Protocol (PAP) authentication and disconnect the mobile node from the wireless network if the request for PAP authentication is detected.

16. The mobile node as in claim 13, wherein the instructions detect receipt from the wireless network during IPCP negotiation of a config-not-acknowledge comprising an IP address option, and disconnect the mobile node from the wireless network if receipt of the config-not-acknowledge is detected.

17. The mobile node as defined in claim 13, wherein the instructions send an agent solicitation message during Mobile IP registration, detect no receipt of an agent advertisement message during a predetermined time period after sending the agent solicitation message, and disconnect the mobile node from the wireless network if receipt of an agent advertisement message during a predetermined time period after sending the agent solicitation message is not detected.

18. A mobile station for use in a wireless communication system wherein the mobile station determines network support for Mobile IP, the mobile station comprising:
means for connecting to a wireless network;
means for testing for a disconnect condition prior to packet network connection between the mobile node and the wireless network, wherein the disconnect condition is an early indication of network non-support for Mobile IP, comprising means for determining if the wireless network requires authentication during Link Control Protocol (LCP) negotiation, wherein determining if the wireless network requires authentication comprises indicating to the wireless network that the mobile node will not perform authentication;
means for disconnecting from the wireless network without performing authentication if the disconnect condition is satisfied; and
means for staying connected to the wireless network if the disconnect condition is not satisfied.

19. A computer-program product comprising a computer-readable medium having instructions thereon, the instructions comprising:
code for connecting a mobile node to a wireless network;
code for testing for satisfaction of any disconnect condition of a plurality of disconnect conditions, wherein each disconnect condition of the plurality of disconnect conditions is an early indication of network support for Mobile IP, wherein the step of testing comprises determining whether authentication is required by the wireless network during Link Control Protocol (LCP) negotiation, wherein determining whether authentication is required comprises indicating to the wireless network that the mobile node will not perform authentication, and wherein the step of testing is performed prior to packet network connection between the mobile node and the wireless network; and
code for disconnecting from the wireless network without performing authentication if authentication is required by the wireless network during LCP negotiation.

* * * * *